United States Patent
Caveney et al.

(10) Patent No.: US 7,686,259 B2
(45) Date of Patent: Mar. 30, 2010

(54) RINGPOST ASSEMBLY

(75) Inventors: Jack E. Caveney, Hinsdale, IL (US); Thomas Stanford, Orland Park, IL (US); Robert J. Krisel, Oak Forest, IL (US)

(73) Assignee: Panduit Corp., Tinley Park, IL (US)

( * ) Notice: Subject to any disclaimer, the term of this patent is extended or adjusted under 35 U.S.C. 154(b) by 1308 days.

(21) Appl. No.: 10/782,277

(22) Filed: Feb. 19, 2004

(65) Prior Publication Data

US 2004/0206855 A1  Oct. 21, 2004

Related U.S. Application Data

(60) Provisional application No. 60/449,238, filed on Feb. 21, 2003.

(51) Int. Cl.
*F16L 3/22* (2006.01)
(52) U.S. Cl. .................... 248/68.1; 248/74.3; 211/85.5; 411/166; 403/13; 403/14
(58) Field of Classification Search ................ 248/74.3, 248/69, 73, 71, 49, 68.1, 74.4, 53; 211/85.5, 211/85.17; 411/166, 163, 389, 178; 403/13, 403/14, 364, 408.1, 359.1, 356
See application file for complete search history.

(56) References Cited

U.S. PATENT DOCUMENTS

| | | | |
|---|---|---|---|
| 806,872 A * | 12/1905 | Clark .......................... 446/465 |
| 921,912 A * | 5/1909 | Thede ......................... 301/121 |
| 938,804 A * | 11/1909 | West ...................... 301/111.03 |
| 1,062,015 A * | 5/1913 | Lane ........................ 285/139.1 |
| 2,757,054 A * | 7/1956 | Van De Warker ........... 384/569 |
| 2,778,159 A * | 1/1957 | Irwin .......................... 446/465 |
| 3,172,071 A * | 3/1965 | Ihrig .......................... 338/163 |
| 3,250,505 A | 5/1966 | Rodman, Sr. et al. |
| 3,492,016 A * | 1/1970 | O'Connor et al. ......... 280/47.26 |
| 3,633,605 A * | 1/1972 | Smith .......................... 137/113 |
| 3,672,743 A * | 6/1972 | Pompey ...................... 312/352 |
| 3,711,226 A * | 1/1973 | Kreuter ....................... 417/480 |
| 3,909,066 A * | 9/1975 | Snowden ................ 301/64.707 |
| 4,534,471 A * | 8/1985 | Zahn et al. ..................... 211/39 |
| 4,562,982 A | 1/1986 | McSherry et al. |
| 4,763,855 A * | 8/1988 | DiVincenzo ................. 242/139 |
| 4,802,876 A * | 2/1989 | Bertrand ....................... 446/95 |
| 4,905,942 A | 3/1990 | Moretti |
| 5,098,241 A | 3/1992 | Aldridge et al. |
| 5,238,152 A * | 8/1993 | Maas et al. ............. 222/153.09 |
| 5,288,161 A * | 2/1994 | Graves et al. ................ 403/324 |

(Continued)

OTHER PUBLICATIONS

Nylon Molding Corporation's Ring Posts Brochure, 3 pages, date unknown.

*Primary Examiner*—Kimberly T Wood
(74) *Attorney, Agent, or Firm*—Robert A. McCann; Christopher S. Clancy; James H. Williams (57) ABSTRACT

A ringpost is disclosed. The ringpost includes an outer member and an inner member secured within the outer member. The outer member has a rib along an interior surface, and the inner member has a groove along an exterior surface that receives the rib. The outer member rotates about the inner member after the inner member is secured within the outer member. A ringpost assembly is also disclosed.

18 Claims, 13 Drawing Sheets

U.S. PATENT DOCUMENTS

| | | | |
|---|---|---|---|
| 5,368,371 A * | 11/1994 | Markling | 301/64.701 |
| 5,379,566 A | 1/1995 | Schwörer | |
| 5,505,411 A | 4/1996 | Heaton et al. | |
| 5,603,555 A * | 2/1997 | Dickey et al. | 301/111.05 |
| D379,424 S | 5/1997 | White, Jr. et al. | |
| 5,653,409 A | 8/1997 | White, Jr. et al. | |
| 5,692,856 A * | 12/1997 | Newman et al. | 403/352 |
| 5,730,399 A | 3/1998 | Baginski | |
| 6,029,828 A * | 2/2000 | Robbins et al. | 211/78 |
| 6,129,317 A | 10/2000 | Rodrigues et al. | |
| 6,196,751 B1 | 3/2001 | Khokhar | |
| 6,575,536 B2 * | 6/2003 | Chen | 301/35.623 |
| 6,637,835 B2 * | 10/2003 | Morris | 301/111.01 |
| 6,709,188 B2 * | 3/2004 | Ushimaru | 403/329 |
| 6,880,787 B2 | 4/2005 | Stephen et al. | |
| 6,880,788 B2 | 4/2005 | Stephen | |
| 6,884,014 B2 * | 4/2005 | Stone et al. | 411/352 |
| 7,108,335 B2 * | 9/2006 | Morris | 301/111.01 |
| 7,252,344 B2 * | 8/2007 | Mercat et al. | 301/124.2 |
| 2003/0171753 A1 * | 9/2003 | Collins et al. | 606/69 |

* cited by examiner

RINGPOST ASSEMBLY

CROSS-REFERENCE TO RELATED APPLICATIONS

This application claims priority to U.S. Provisional Application Ser. No. 60/449,238, filed on Feb. 21, 2003, the entirety of which is hereby incorporated by reference.

BACKGROUND OF THE INVENTION

The present invention is directed to a ringpost assembly and, more particularly, a ringpost assembly comprising a plurality of two-piece, stackable ringposts, each having a free-spinning hub.

Ringposts have been utilized for wire bundle management in aircraft, marine, automotive and other electronic products. For example, Nylon Molding Corporation's RP series ringposts provide one to six levels of wiring on one rack or support structure, and can accommodate bundles up to 1¼ inch in diameter. The RP1700 ringpost comprises a single ringpost without a screw. The RP1703 and RP1704 ringposts comprise a standard size hex head screw insert molded into a single and double ringpost, respectively, along with a steel socket which is also insert molded. However, none of the prior ringposts, including the Nylon Molding Corporation ringposts, allow a hub to freely rotate about a fastener after the ringpost has been torqued down into a mounting structure. Moreover, none of the prior ringposts provide for self-alignment when multiple ringposts are vertically stacked.

SUMMARY OF THE INVENTION

It would be desirable to provide a ringpost having a fastener snap-fitted within a hub, while still allowing the hub to rotate freely about the fastener after the ringpost has been torqued down into a mounting structure.

It would also be desirable to provide a plurality of stackable ringposts that vertically self-align.

A ringpost is disclosed. The ringpost includes an outer member and an inner member secured within the outer member. The outer member has a rib along an interior surface, and the inner member has a groove along an exterior surface that receives the rib. The outer member rotates about the inner member after the inner member is secured within the outer member.

Preferably, the outer member is a hub and the inner member is a threaded fastener. The fastener is snap-fitted within the hub.

Preferably, the inner member has a shoulder extending beyond a bottom end of the outer member when the inner member is secured within the outer member.

Preferably, the outer member has a plurality of rungs equidistantly spaced thereabout.

Preferably, the outer member has four notches adjacent a first end thereof, and four fingers adjacent a second end thereof. The fingers are vertically aligned with the notches.

Preferably, a sleeve circumscribes the notches.

A ringpost assembly is also disclosed. The ringpost assembly includes a first ringpost and a second ringpost secured to the first ringpost. The first ringpost has a first outer member and a first inner member secured therein. The first outer member has a plurality of notches adjacent a first end thereof. The second ringpost has a second outer member and a second inner member secured therein. The second outer member has a plurality of fingers adjacent a first end thereof. The first ringpost notches receive the second ringpost fingers to self-align the first ringpost and the second ringpost.

Preferably, a third ringpost is secured to the second ringpost.

DETAILED DESCRIPTION OF PREFERRED EMBODIMENTS

The illustrated embodiments of the invention are directed to a ringpost assembly comprising a plurality of two-piece, stackable ringposts, each having a free-spinning hub. FIGS. 1-15 are directed to a ringpost assembly 20, and FIGS. 16-19 are directed to a ringpost assembly 120.

Figure 1:
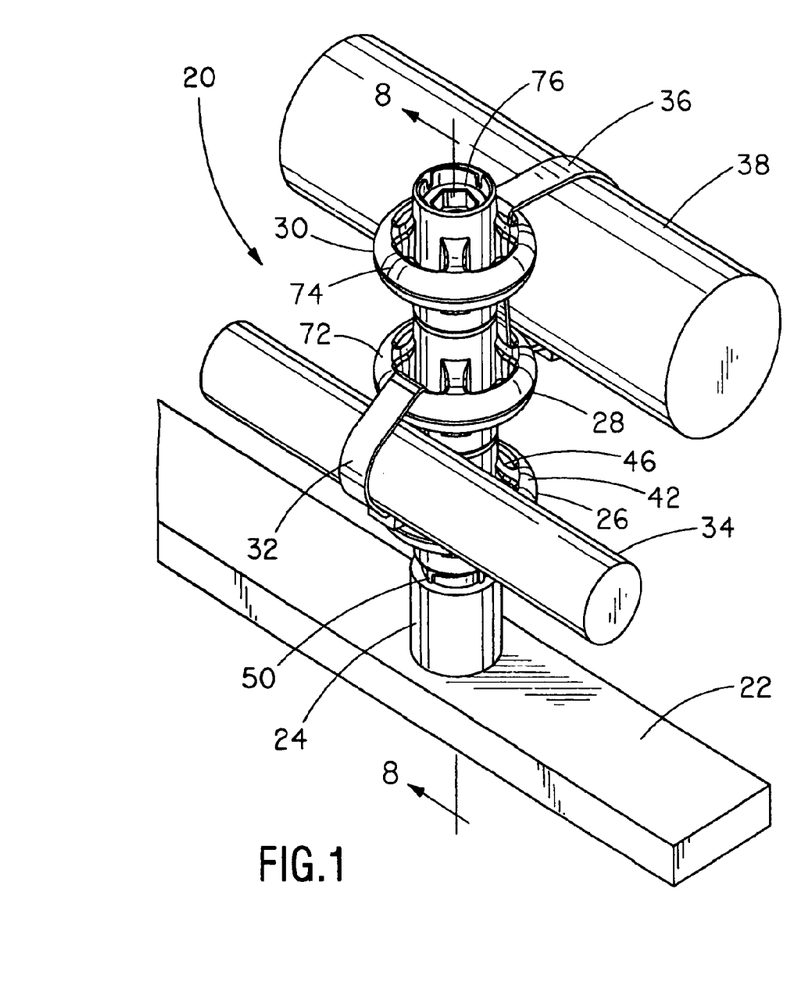
FIG. 1 is a top front perspective view of a ringpost assembly of the present invention, shown having two cable ties for securing various size wire bundles therein.
Figure 2:
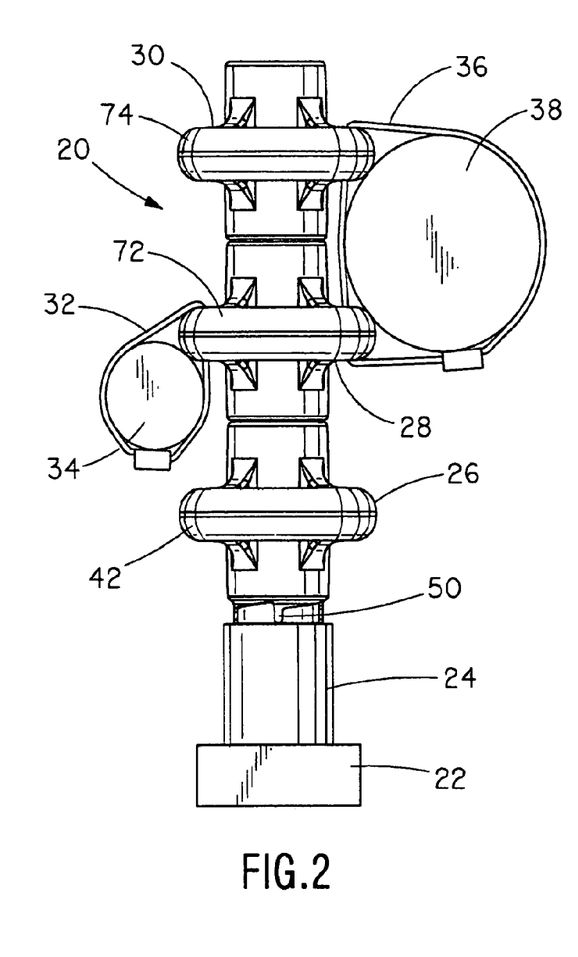
FIG. 2 is a side elevational view of the ringpost assembly of FIG. 1.

FIGS. 1 and 2 show a fully assembled ringpost assembly 20. Ringpost assembly 20 includes a mounting structure 22 having a base 24, a first ringpost 26, a second ringpost 28, a third ringpost 30, a first cable tie 32, a first wire bundle 34, a second cable tie 36 and a second wire bundle 38. Preferably, first ringpost 26, second ringpost 28 and third ringpost 30 are substantially identical. Moreover, first cable tie 32 and second cable tie 36 are Panduit CONTOUR-TY® cable ties. It is likewise contemplated that ringpost assembly 20 may include any number of stackable ringposts.

As best seen in FIG. 2, first cable tie 32 secures first wire bundle 34 to one rung of second ringpost 28, and second cable tie 36 secures second wire bundle 38 to one rung of second ringpost 28 and one rung of third ringpost 30. Preferably, when securing large wire bundles to ringpost assembly 20, the cable tie should pass through one rung on each of two adjacent ringposts. Moreover, when securing small wire bundles to ringpost assembly 20, the cable tie should only pass through one rung on one ringpost. Thus, as shown in FIGS. 1 and 2, first wire bundle 34 is an example of a small wire bundle, and second wire bundle 38 is an example of a large wire bundle. It is likewise contemplated that ringpost assembly 20 may include any number of cable ties and wire bundles.

Figure 3:
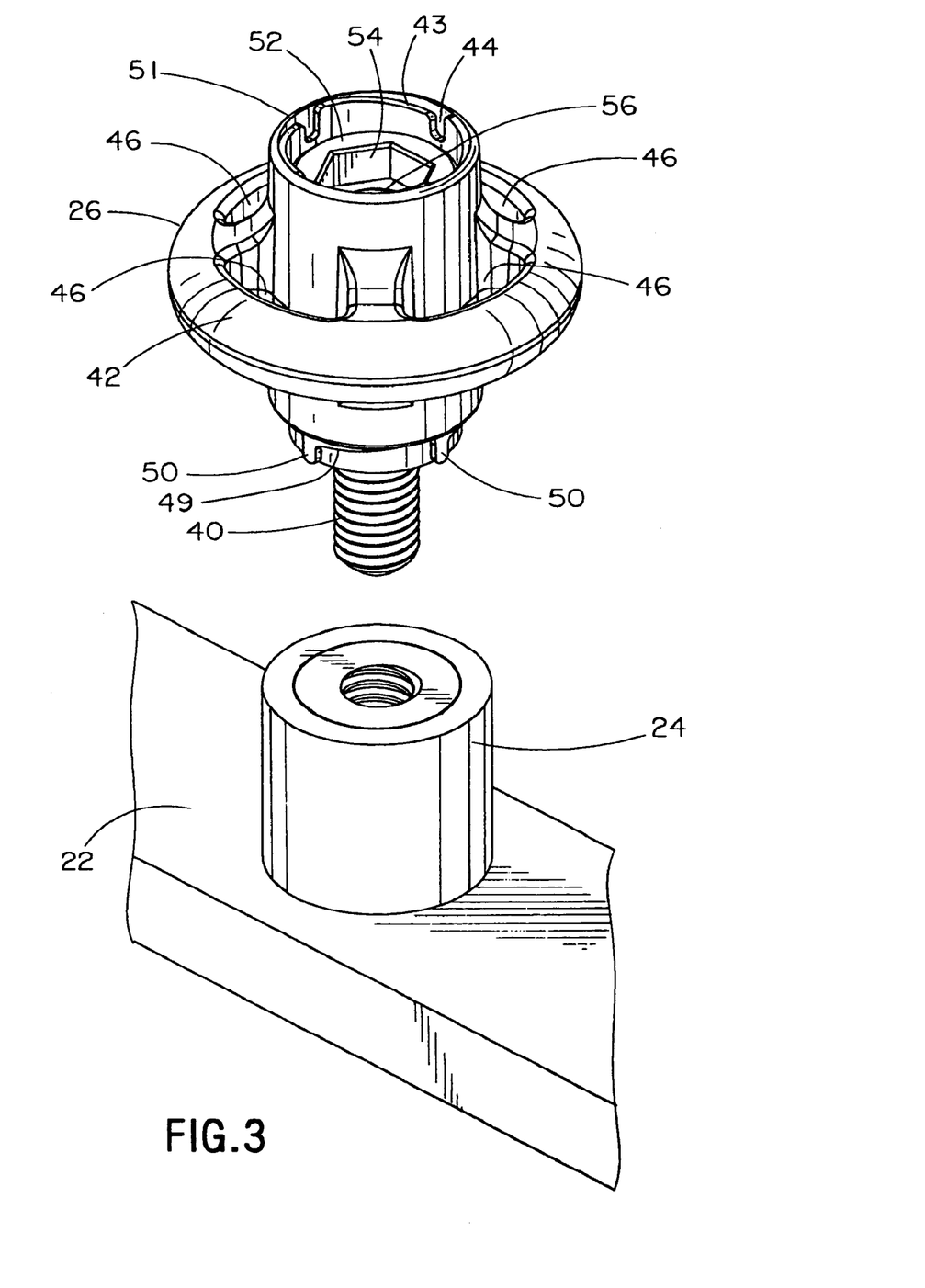
FIG. 3 is a top front perspective view of the first ringpost utilized in the ringpost assembly of FIG. 1.
Figure 4:
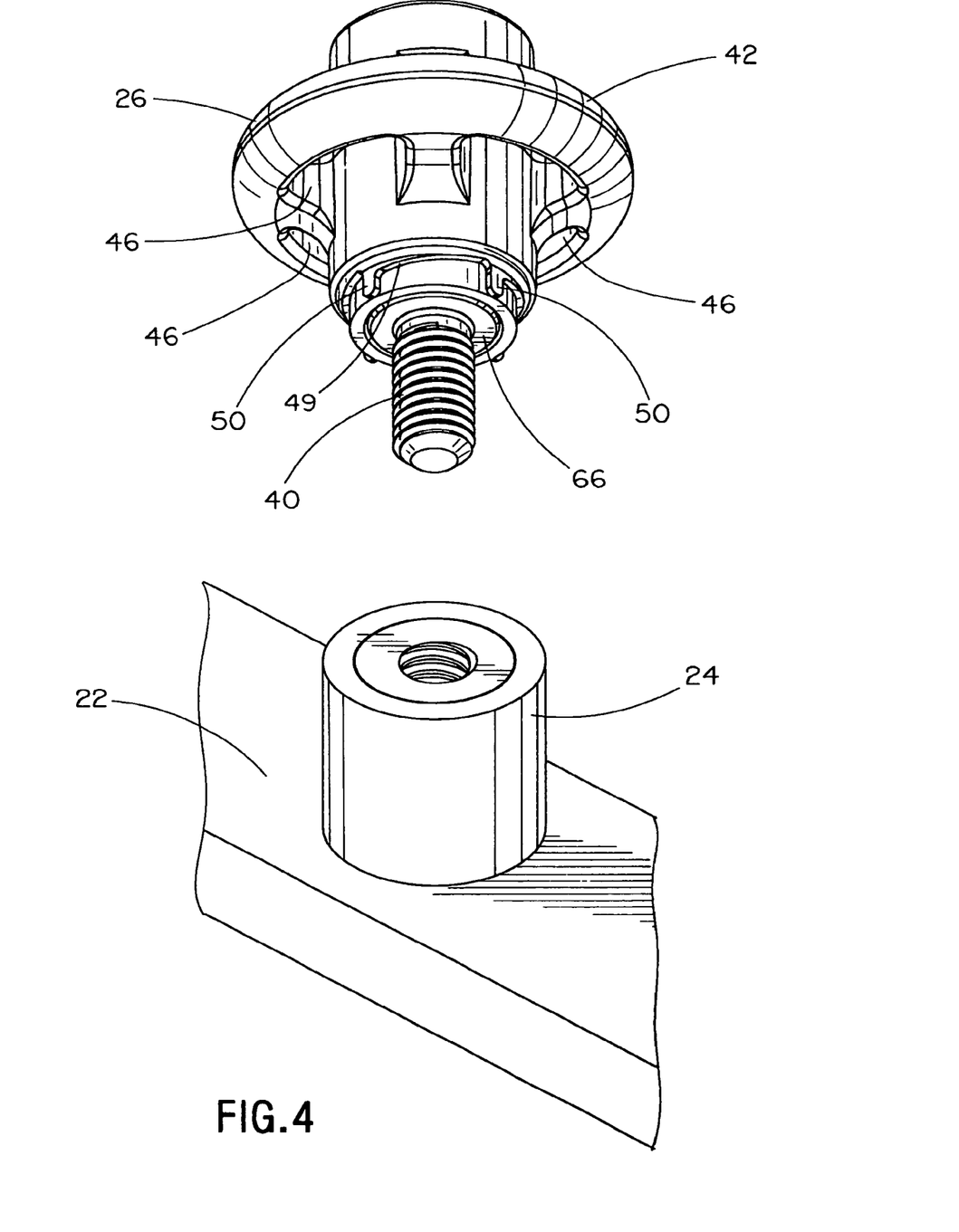
FIG. 4 is a bottom front perspective view of the first ringpost utilized in the ringpost assembly of FIG. 1.
Figures 5, 6:
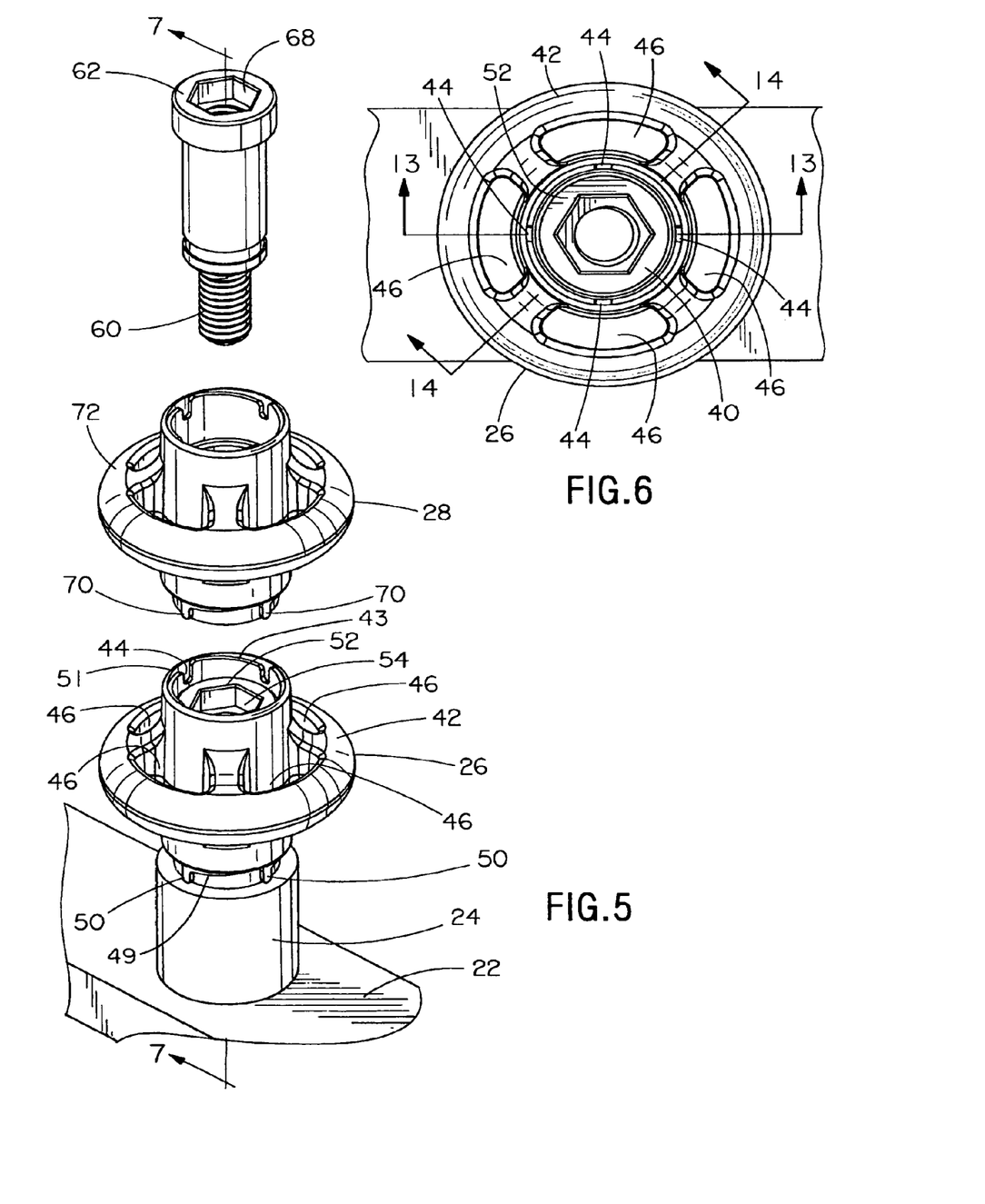
FIG. 5 is an exploded top perspective view of the ringpost of FIG. 3, shown positioned above a first ringpost secured to a mounting structure.
FIG. 6 is a top view of the ringpost of FIG. 3.

FIGS. 3 and 4 show first ringpost 26 prior to attachment to mounting structure 22, and FIG. 5 shows first ringpost 26 after attachment to mounting structure 22. First ringpost 26 includes a fastener 40 snap-fitted within a hub 42. Preferably, fastener 40 is a threaded fastener made of titanium, and hub 42 is made of plastic. The titanium fastener 40 is lighter than a fastener having a steel socket and a titanium stud and, thus, provides a weight advantage over existing ringposts. Similarly, each of second ringpost 28 and third ringpost 30 includes a fastener snap-fitted within a hub.

As shown in FIGS. 5-8, hub 42 includes four notches 44, four rungs 46, a rib 48 and four fingers 50. Hub 42 has a helical geometry 43 between notches 44 to facilitate self-alignment of second ringpost 28 to first ringpost 26, as shown in FIG. 5. Hub 42 also has a helical geometry 49 between fingers 50, as shown in FIG. 4. Notches 44 and fingers 50 are separated from each other with helical geometry 43 and 49, respectively, and the pitch of helical geometry 43, 49 is greater than the pitch of the threads on fastener 40. The mating helixes ensure engagement and alignment of the notches and fingers and, thus, automatically align the rungs of the stacked ringposts.

Figure 12:
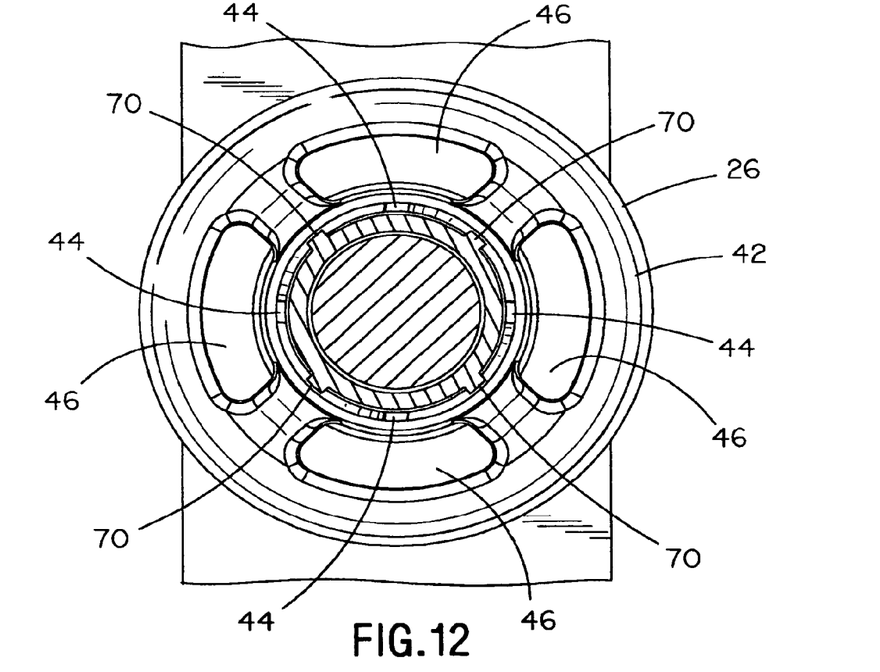
FIG. 12 is a cross-sectional view taken along lines 12-12 of FIG. 11.

As best seen in FIG. 12, notches 44 are vertically centered within rungs 46, which allows a cable tie to shield the wire bundles from notches 44. Moreover, hub 42 includes a sleeve 51 positioned around notches 44 to prevent exposing any sharp edges at the top side of hub 42, as best seen in FIG. 3. Although hub 42 is shown in FIG. 6 having four rungs 46, it is likewise contemplated that hub 42 may have any number of rungs 46.

Figure 7:
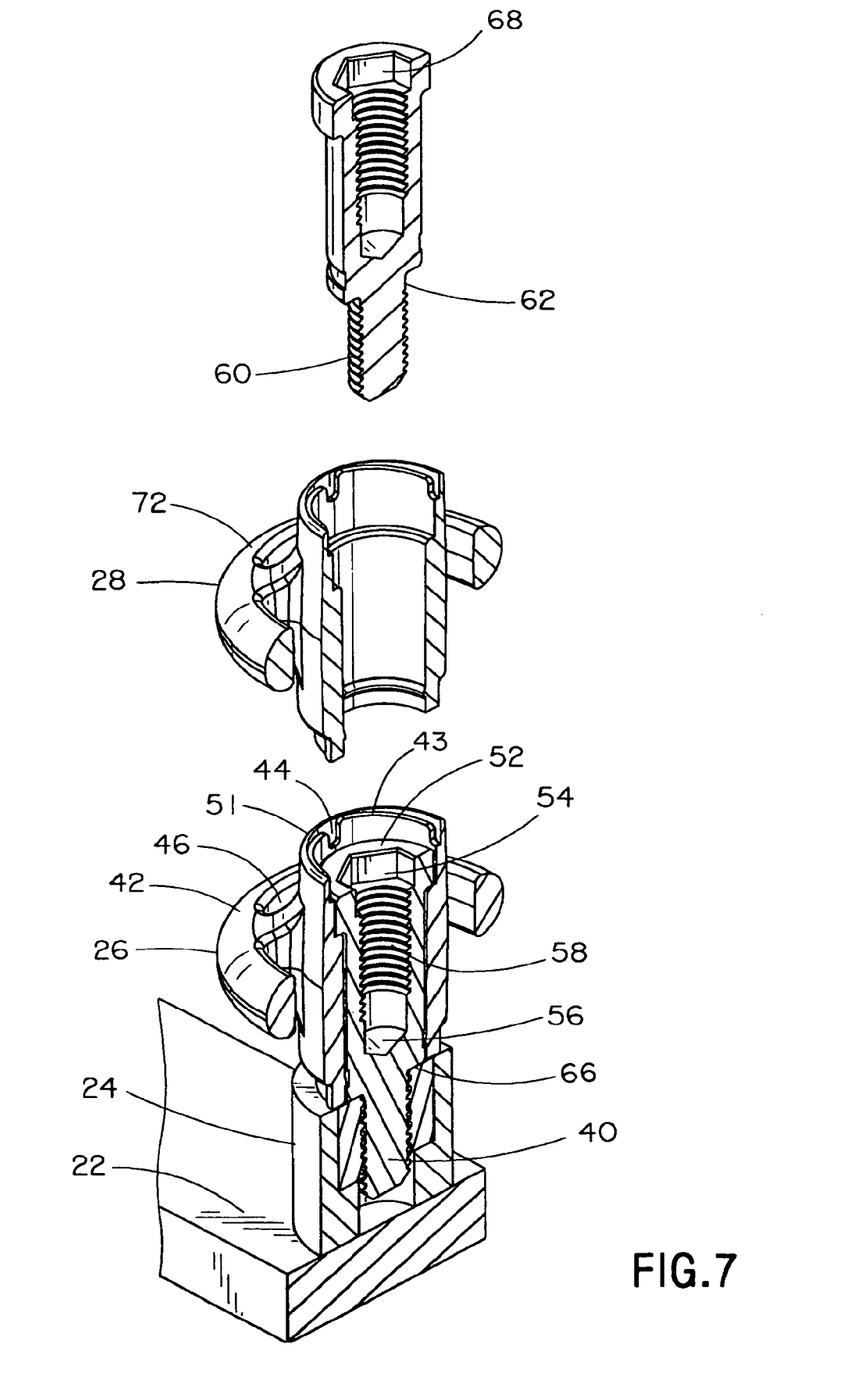
FIG. 7 is a cross-sectional view taken along lines 7-7 of FIG. 5.

As best seen in FIG. 7, fastener 40 has a head 52 which retains hub 42, and head 52 has a hex pocket 54 for receiving an alien head tool (not shown) utilized to tighten first ringpost 26 to mounting structure 22. Head 52 is positioned below sleeve 51. An aperture 56 runs down the primary axis of fastener 40, and fastener 40 has internal threads 58 to facilitate engagement with a stud 60 of a fastener 62 protruding from second ringpost 28, as shown in FIG. 7.

Figure 13:
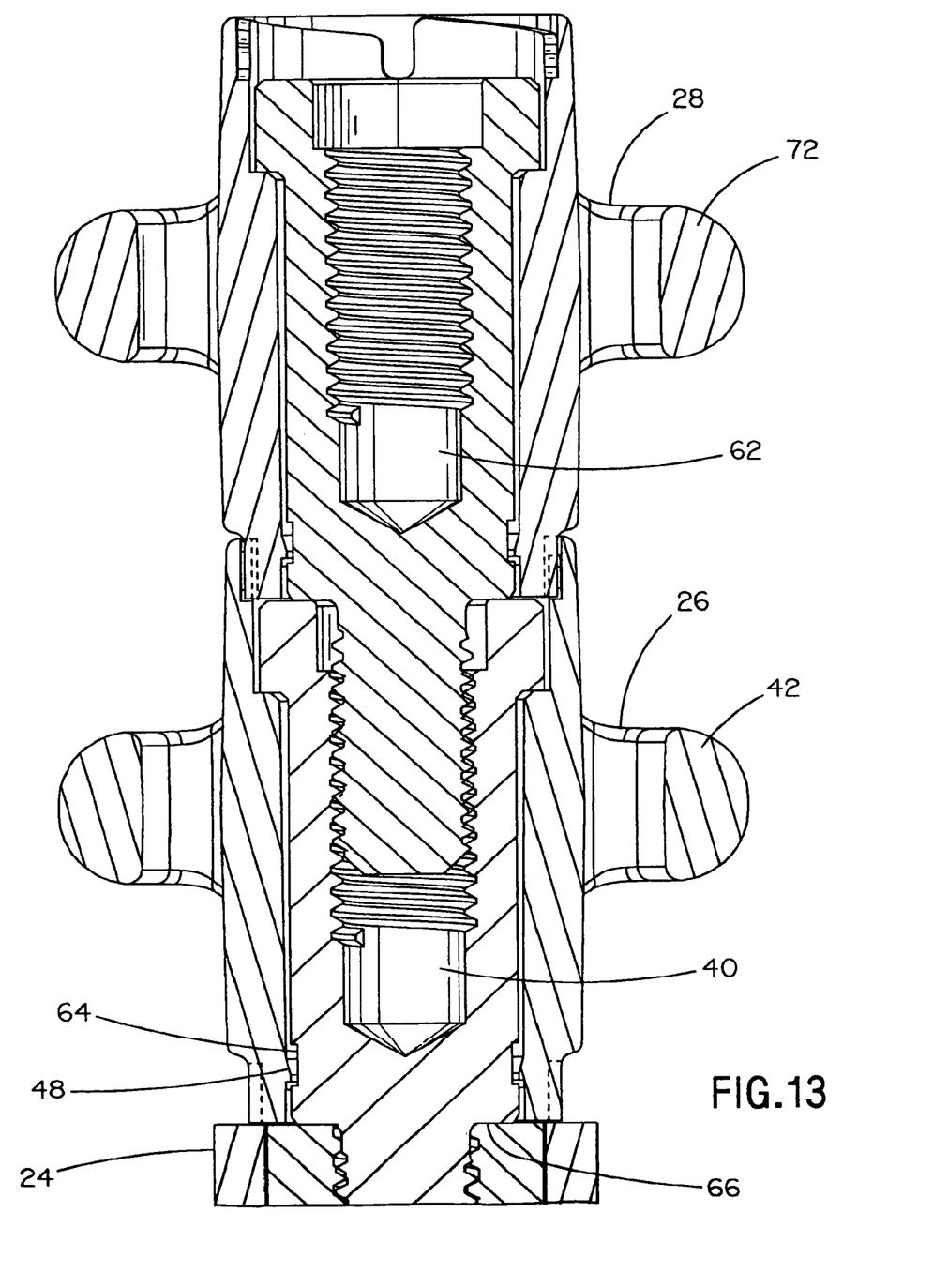
FIG. 13 is a cross-sectional view taken along lines 13-13 of FIG. 6.
Figure 14:
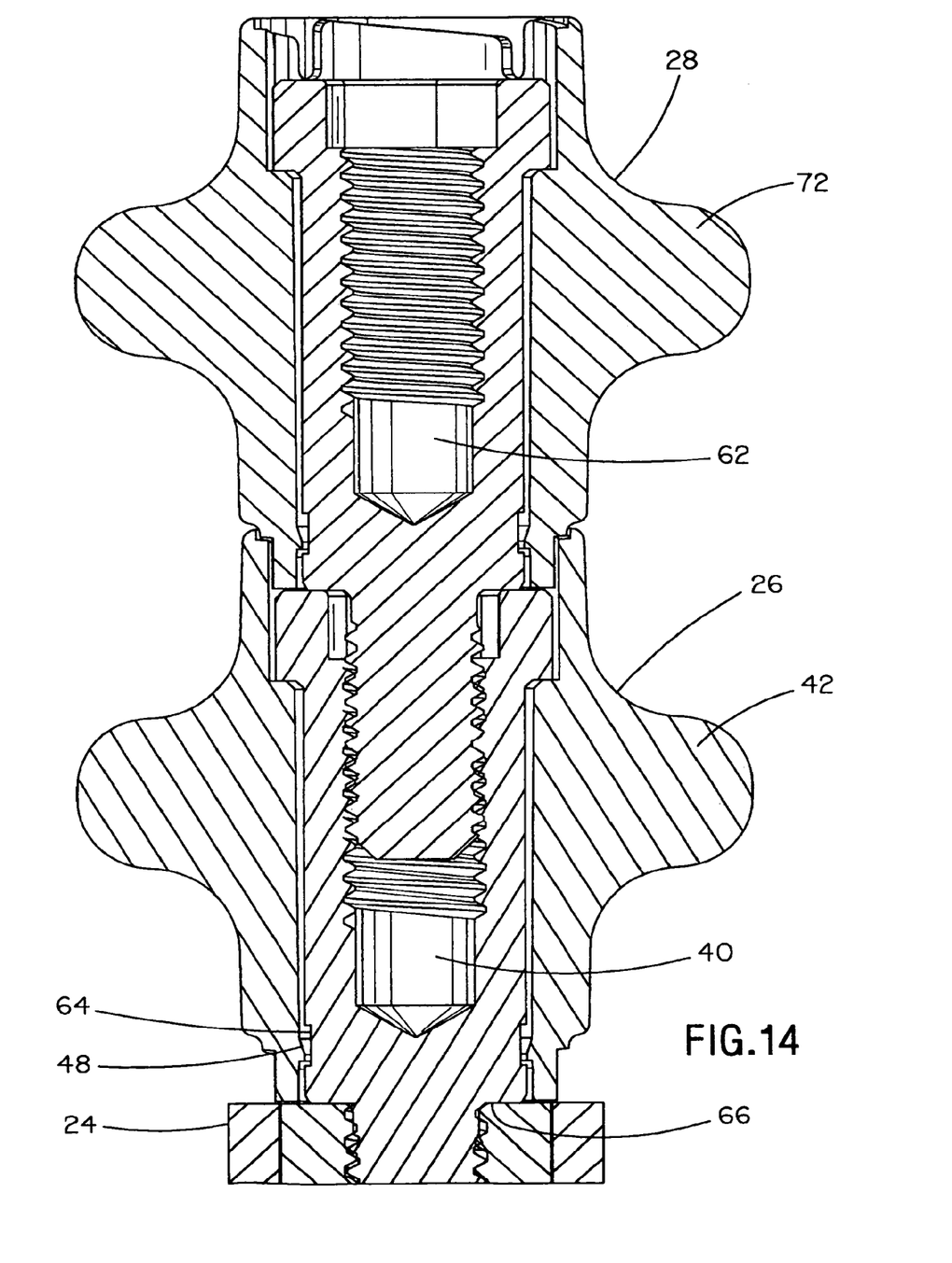
FIG. 14 is a cross-sectional view taken along lines 14-14 of FIG. 6.
Figure 15:
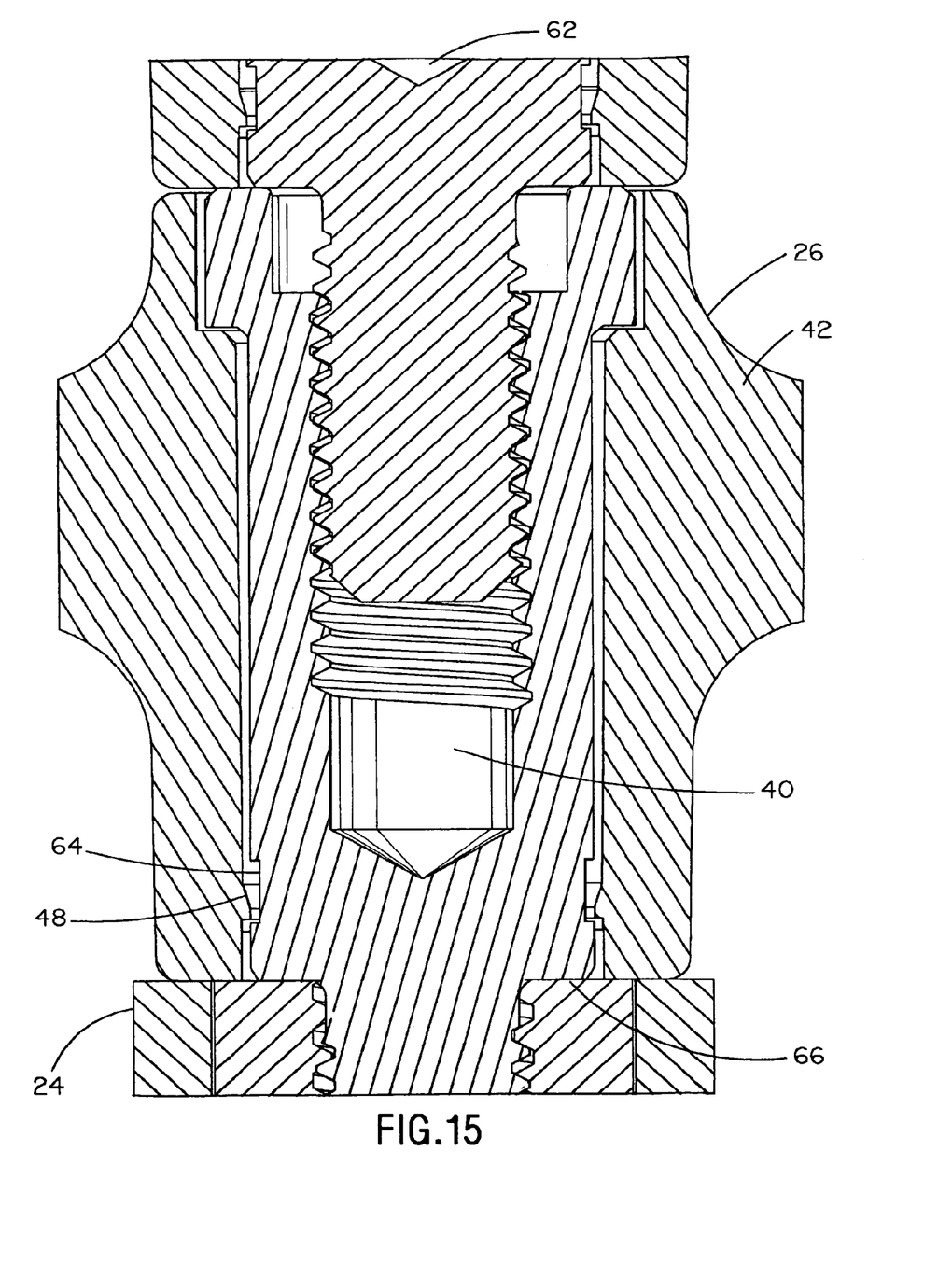
FIG. 15 is an enlarged view of a section of FIG. 14.

As best seen in FIGS. 13-15, rib 48 is molded into the inside diameter of hub 42, and fastener 40 has a groove 64 for capturing rib 48. Shoulder 66 of fastener 40 may extend just below the bottom of hub 42, as best seen in FIG. 14, so as to allow rotation of hub 42 after fastener 40 is torqued down to mounting structure 22. Alternatively, shoulder 66 may be even with the bottom of hub 42, as best seen in FIG. 15, while still allowing rotation of hub 42 after fastener 40 is torqued down to mounting structure 22.

Figure 8:
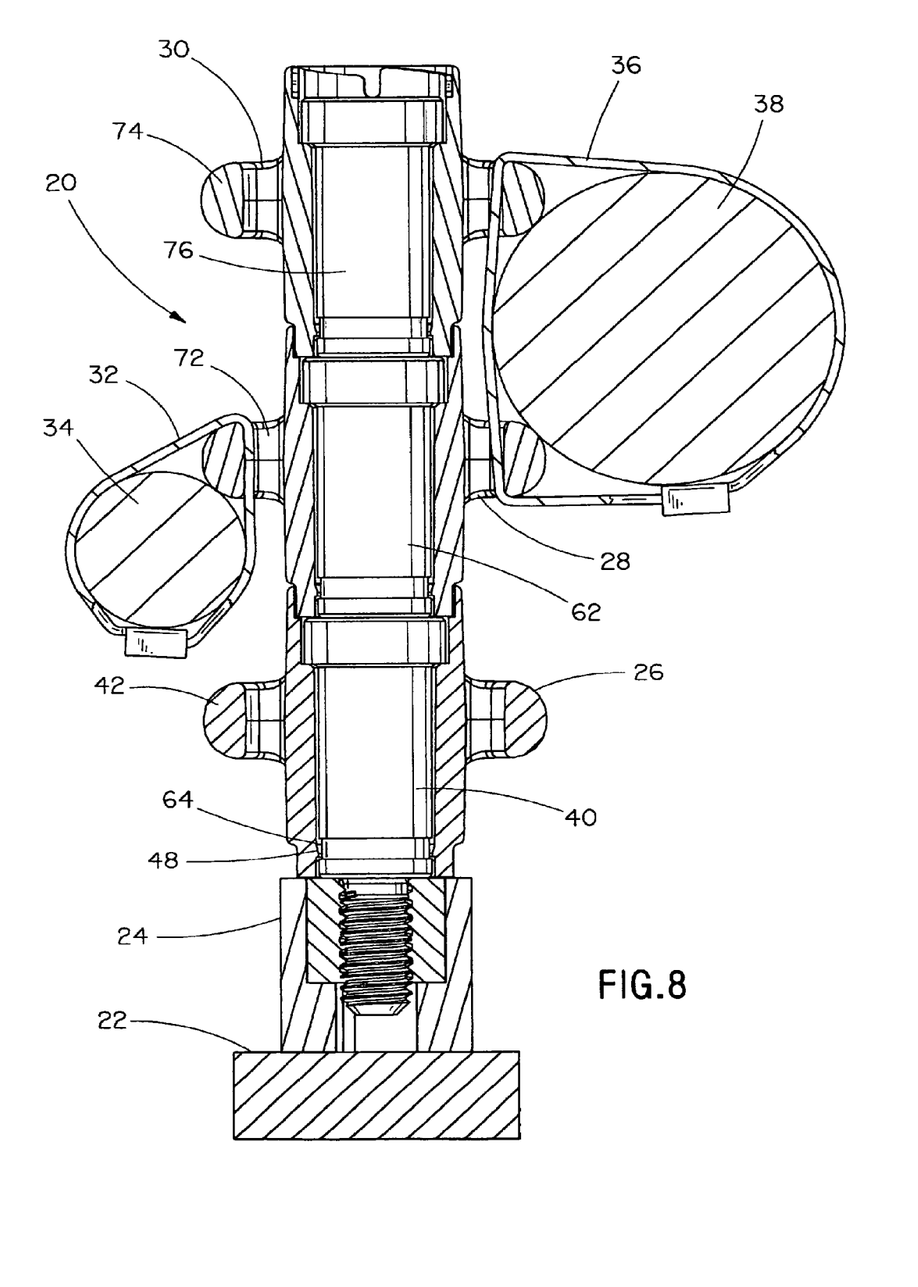
FIG. 8 is a partial cross-sectional view taken along lines 8-8 of FIG. 1.
Figure 9:
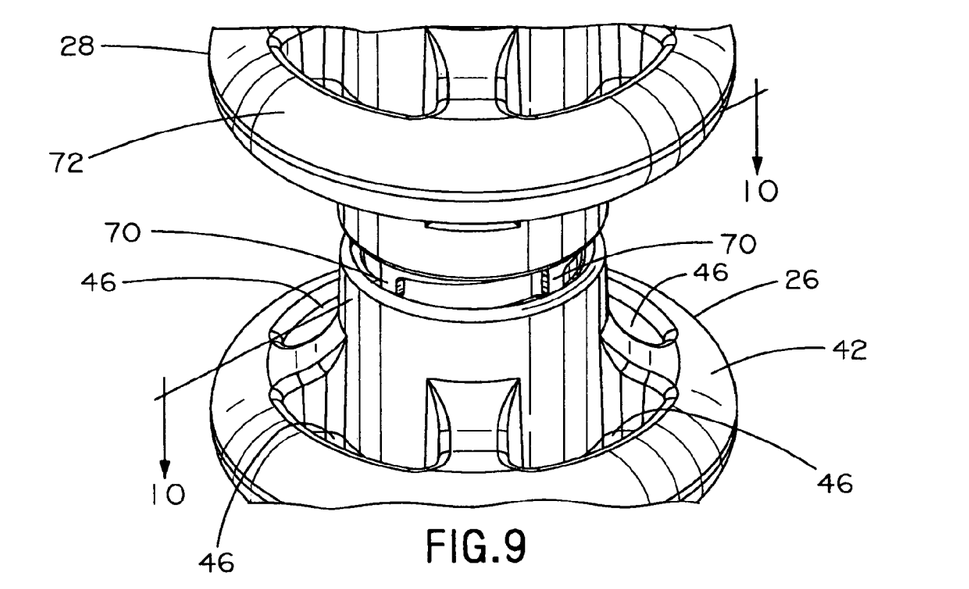
FIG. 9 is an enlarged view of a section of FIG. 5, showing the second ringpost aligned with the first ringpost.
Figure 10:
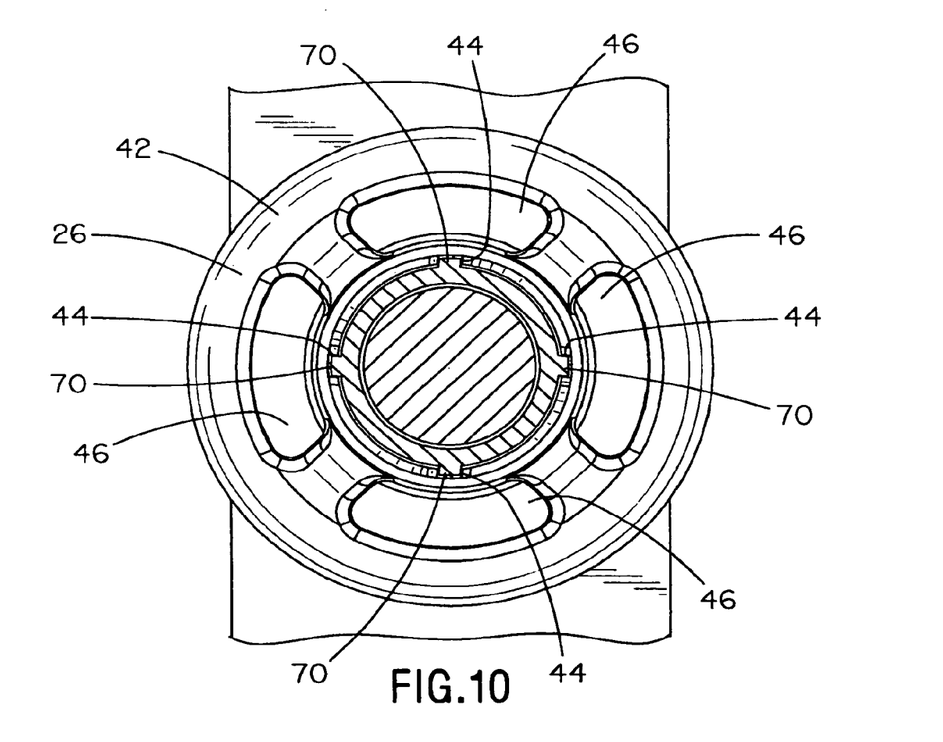
FIG. 10 is a cross-sectional view taken along lines 10-10 of FIG. 9.
Figure 11:
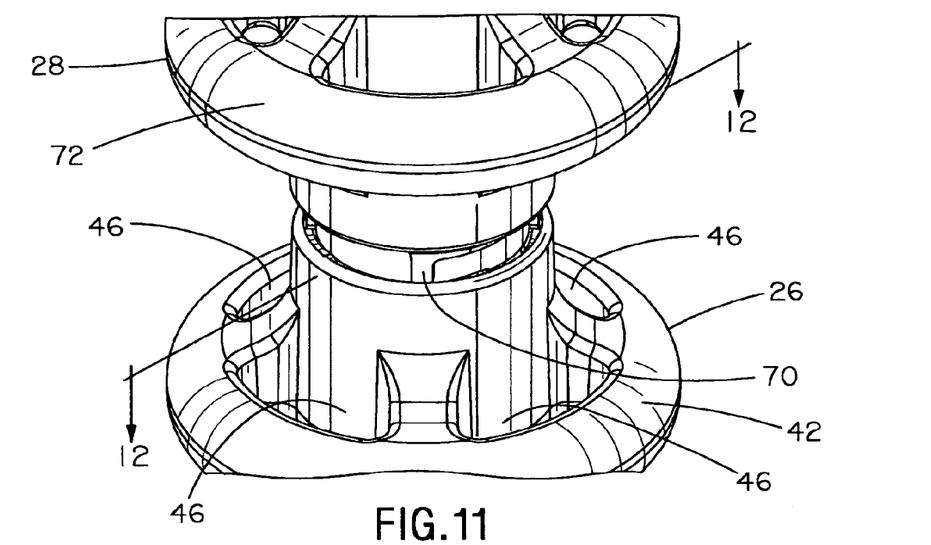
FIG. 11 is an enlarged view of a section of FIG. 5, showing the second ringpost before it is aligned with the first ringpost.

In operation, fastener 40 is snap-fitted within hub 42. As shown in FIG. 8, first ringpost 26 is torqued down until it is secured within mounting structure 22. After first ringpost 26 has been secured to mounting structure 22, hub 42 is free-spinning about fastener 40. Subsequently, as shown in FIGS. 11 and 12, second ringpost 28 is positioned above first ringpost 26, and second ringpost 28 is threaded into first ringpost 26, as best seen in FIGS. 9 and 10. The allen head tool is inserted into hex pocket 68 of second ringpost 28 and, as second ringpost 28 is torqued down, self-alignment fingers 70 of second ringpost 28 are received within notches 44 of first ringpost 26, as shown in FIGS. 9 and 10. After second ringpost 28 has been secured to first ringpost 26, hub 72 is free-spinning about fastener 62.

The notch and finger configuration allows hub 72 to spin about fastener 62 in either the clockwise or counterclockwise direction, while retaining self-alignment between first ringpost 26 and second ringpost 28. Finally, as shown in FIGS. 1 and 2, third ringpost 30 is secured to second ringpost 28. After third ringpost 30 is secured to second ringpost 28, hub 74 is free-spinning about fastener 76. Additional ringposts can be stacked on the assembly. Regardless of the number of stackable ringposts utilized, their respective rungs will self-align upon assembly, and remain free-spinning as a unit.

The second embodiment of the present invention is illustrated in FIGS. 16-19. The ringpost assembly 120 is similar to ringpost assembly 20, except that ringpost assembly 120 does not possess the self-alignment feature of ringpost assembly 20. First ringpost 126 is dimensionally similar to Nylon Molding Corporation's RP series ringposts, thus allowing first ringpost 126 to be interchangeable with the RP series ringposts.

Figure 16:
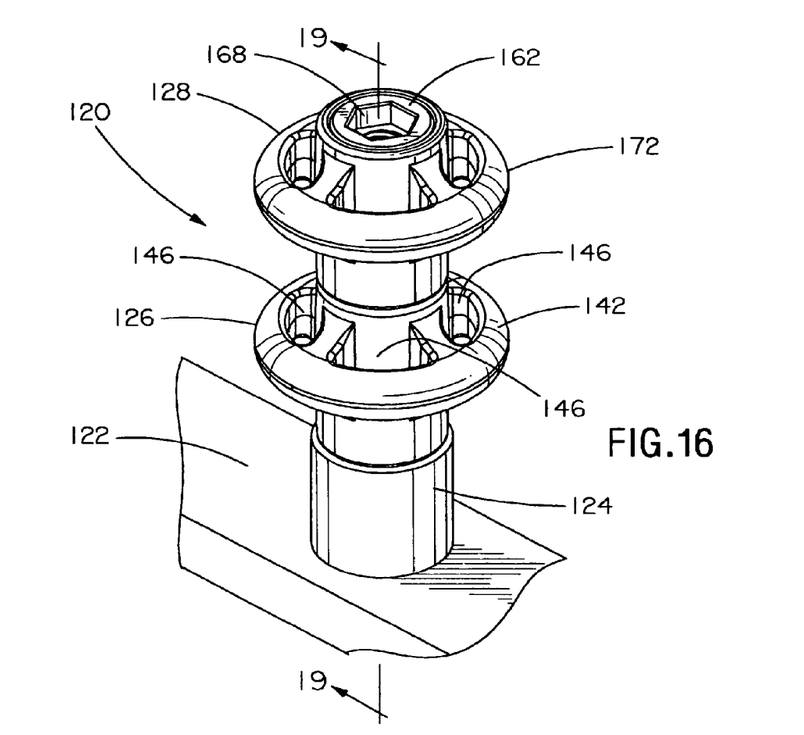
FIG. 16 is a top front perspective view of a ringpost assembly according to a second embodiment of the present invention.

FIG. 16 shows a partially assembled ringpost assembly 120. Ringpost assembly 120 includes a mounting structure 122 having a base 124, a first ringpost 126 and a second ringpost 128. Preferably, first ringpost 126 and second ringpost 128 are substantially identical. It is likewise contemplated that ringpost assembly 120 may include any number of stackable ringposts.

Figure 19:
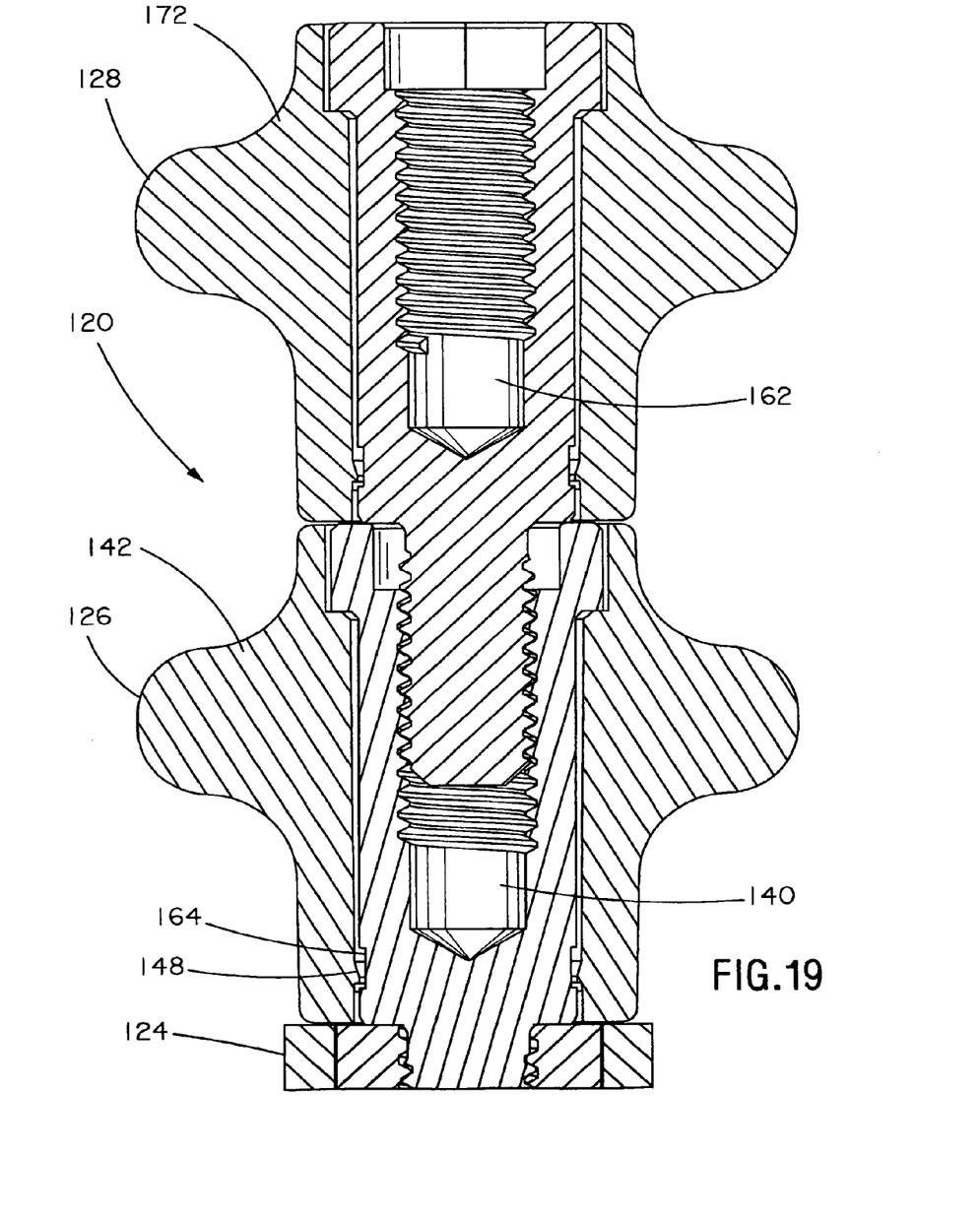
FIG. 19 is a cross-sectional view taken along lines 19-19 of FIG. 16.

As best seen in FIG. 19, first ringpost 126 includes a fastener 140 snap-fitted within a hub 142. Preferably, fastener 140 is a threaded fastener made of titanium, and hub 142 is made of plastic. The titanium fastener 140 is lighter than a fastener having a steel socket and a titanium stud and, thus, provides a weight advantage over existing ringposts. Similarly, second ringpost 128 includes a fastener 162 snap-fitted within a hub 172.

Figure 17:
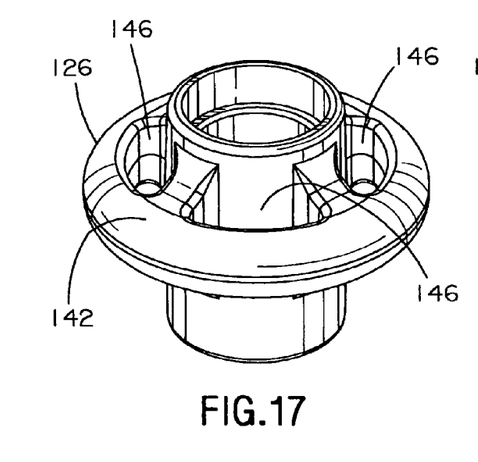
FIG. 17 is a top front perspective view of the first ringpost utilized in the ringpost assembly of FIG. 16.
Figure 18:
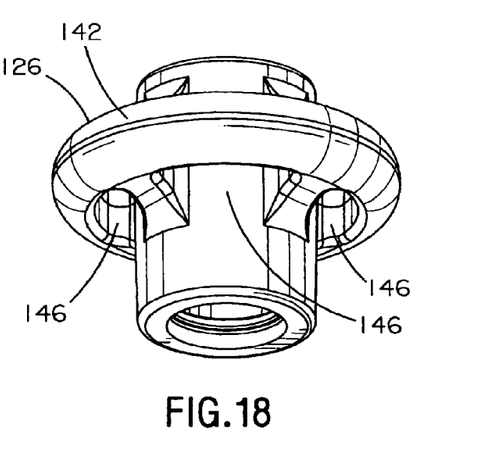
FIG. 18 is a bottom front perspective view of the first ringpost utilized in the ringpost assembly of FIG. 16.

As shown in FIGS. 15-19, hub 142 includes four rungs 146 and a rib 148. As best seen in FIG. 19, rib 148 is molded into the inside diameter of hub 142, and fastener 140 has a groove 164 for capturing rib 148. Although hub 142 is shown in FIGS. 16-18 having four rungs 146, it is likewise contemplated that hub 142 may have any number of rungs 146.

As best seen in FIG. 16, fastener 140 has a head 152 which retains hub 142, and head 152 has a hex pocket 154 for receiving an alien head tool (not shown) utilized to tighten first ringpost 126 to mounting structure 122. As shown in FIG. 19, fastener 140 extends just beyond the top end of hub 142, to ensure second ringpost 128 engages fastener 140 instead of hub 142.

In operation, fastener 140 is snap-fitted within hub 142. As shown in FIG. 16, first ringpost 126 is torqued down until it is secured within mounting structure 122. After first ringpost 126 has been secured to mounting structure 122, hub 142 is free-spinning about fastener 140. Subsequently, second ringpost 128 is secured to first ringpost 126. The alien head tool is inserted into hex pocket 168 of second ringpost 128, and second ringpost 128 is torqued down until the bottom end of fastener 162 contacts the top end of fastener 140, as shown in FIG. 19. After second ringpost 128 has been secured to first ringpost 126, hub 142 and hub 172 are independently free-spinning. The ease of rotation allows for simple operator alignment of the rungs. Additional ringposts can be stacked on the assembly.

The disclosed invention provides a ringpost assembly comprising a plurality of two-piece, stackable ringposts, each having a free-spinning hub. It should be noted that the above-described and illustrated embodiments and preferred embodiments of the invention are not an exhaustive listing of the forms such a ringpost assembly in accordance with the invention might take; rather, they serve as exemplary and illustrative of embodiments of the invention as presently understood. By way of example, and without limitation, a ringpost assembly having more than three stackable ringposts is contemplated to be within the scope of the invention. Many other forms of the invention are believed to exist.

The invention claimed is:

1. A ringpost assembly comprising:
a first ringpost having a first outer member and a first inner member secured therein, the first outer member having a plurality of notches adjacent a first end thereof; and
a second ringpost secured to the first ringpost, the second ringpost having a second outer member and a second inner member secured therein, the second outer member having a plurality of fingers adjacent a first end thereof,
wherein the notches of the first outer member receive the fingers of the second outer member to self-align the first ringpost and the second ringpost,
wherein the first outer member and the second outer member are hubs and the first inner member and the second inner member are threaded fasteners.

2. The ringpost assembly of claim 1, further comprising a third ringpost secured to the second ringpost.

3. The ringpost assembly of claim 1, wherein the first inner member has a shoulder extending beyond a first end of the first outer member when the first inner member is secured within the first outer member.

4. The ringpost assembly of claim 1, wherein the second inner member has a shoulder extending beyond a first end of the second outer member when the second inner member is secured within the second outer member.

5. The ringpost assembly of claim 1, wherein each of the first outer member and the second outer member has a plurality of rungs equidistantly spaced thereabout.

6. The ringpost assembly of claim 1, wherein the first inner member is snap-fitted within the first outer member and the second inner member is snap-fitted within the second outer member.

7. The ringpost assembly of claim 1, wherein the second outer member has a plurality of notches adjacent a second end thereof.

8. The ringpost assembly of claim 7, wherein a first sleeve circumscribes the notches of the first outer member and a second sleeve circumscribes the notches of the second outer member.

9. The ringpost assembly of claim 7, wherein the first outer member has a plurality of fingers adjacent a second end thereof.

10. The ringpost assembly of claim 9, wherein the fingers of the first outer member are vertically aligned with the notches of the first outer member.

11. A ringpost comprising:
an outer member having a rib along an interior surface, a plurality of rungs equidistantly spaced about the outer member, and four notches adjacent a first end thereof, wherein a sleeve circumscribes the notches; and
an inner member secured within the outer member, the inner member having a groove along an exterior surface that receives the rib,
wherein the outer member rotates about the inner member after the inner member is secured within the outer member.

12. A ringpost comprising:
an outer member having a rib along an interior surface, a plurality of rungs equidistantly spaced about the outer member, four notches adjacent a first end thereof, and four fingers adjacent a second end thereof; and
an inner member secured within the outer member, the inner member having a groove along an exterior surface that receives the rib,
wherein the outer member rotates about the inner member after the inner member is secured within the outer member.

13. The ringpost of claim 12, wherein the fingers are vertically aligned with the notches.

14. A ringpost comprising:
an outer member having a rib along an interior surface and a plurality of rungs equidistantly spaced about the outer member and four notches adjacent a first end thereof; and
an inner member snap-fitted within the outer member, the inner member having a groove along an exterior surface that receives the rib,
wherein the outer member rotates about the inner member after the inner member is snap-fitted within the outer member.

15. The ringpost of claim 14, wherein a sleeve circumscribes the notches.

16. The ringpost of claim 14, wherein the outer member has four fingers adjacent a second end thereof.

17. The ringpost of claim 16, wherein the fingers are vertically aligned with the notches.

18. A ringpost assembly comprising:
a first ringpost having a first outer member and a first inner member secured therein, the first outer member having a plurality of notches adjacent a first end thereof; and
a second ringpost secured to the first ringpost, the second ringpost having a second outer member and a second inner member secured therein, the second outer member having a plurality of fingers adjacent a first end thereof,
wherein the notches of the first outer member receive the fingers of the second outer member to self-align the first ringpost and the second ringpost,
wherein the second outer member has a plurality of notches adjacent a second end thereof,
wherein a first sleeve circumscribes the notches of the first outer member and a second sleeve circumscribes the notches of the second outer member.

* * * * *

UNITED STATES PATENT AND TRADEMARK OFFICE
CERTIFICATE OF CORRECTION

Page 1 of 1

PATENT NO. : 7,686,259 B2
APPLICATION NO. : 10/782277
DATED : March 30, 2010
INVENTOR(S) : Jack E. Caveney et al.

It is certified that error appears in the above-identified patent and that said Letters Patent is hereby corrected as shown below:

Column 3, line 44 which reads "an alien head tool (not shown) utilized to tighten first ringpost" should read "an allen head tool (not shown) utilized to tighten first ringpost".

Column 4, line 47 which reads "receiving an alien head tool (not shown) utilized to tighten" should read "receiving an allen head tool (not shown) utilized to tighten".

Column 4, line 57 which reads "post 128 is secured to first ringpost 126. The alien head tool is" should read "post 128 is secured to first ringpost 126. The allen tool is".

Signed and Sealed this
Twenty-fourth Day of May, 2011

David J. Kappos
*Director of the United States Patent and Trademark Office*